Sept. 19, 1961     A. ROYCE     3,000,706
CONTROL OF BACTERIOLOGICAL STERILISATION
Filed April 17, 1959
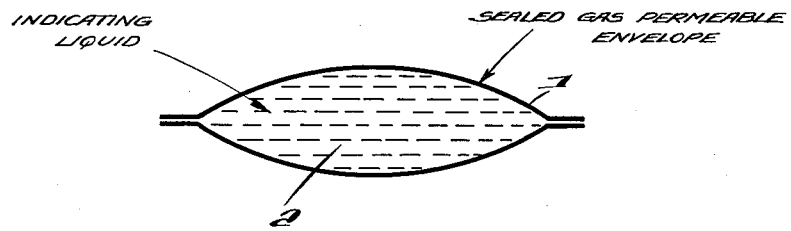
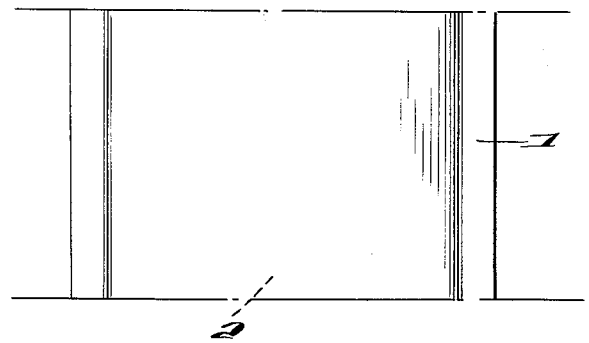
INVENTOR
ALEC ROYCE,
BY
ATTORNEYS

United States Patent Office 3,000,706
Patented Sept. 19, 1961

3,000,706
CONTROL OF BACTERIOLOGICAL
STERILISATION
Alec Royce, Nottingham, England, assignor to Boots Pure
Drug Company Limited, Nottingham, England, a British company
Filed Apr. 17, 1959, Ser. No. 807,252
Claims priority, application Great Britain Apr. 22, 1958
23 Claims. (Cl. 23—232)

This invention relates to a new device for the control of fumigation and bacteriological sterilisation.

There are various methods available for effecting the bacteriological sterilisation of pharmaceutical products, for foodstuffs and the like, the most frequently applied method being the heat treatment of the material in an autoclave or its equivalent. There are some materials, however, which are not conveniently sterilised by this means due to some inherent lability in the molecule or to some interaction between the compounds of a composition and other methods have been devised whereby sterilisation may be carried out at a much lower temperature to avoid thermal decomposition. Such materials may be sterilised by subjecting them to the action of gaseous atmospheres compatible with the materials themselves but lethal to the contaminating organisms. In addition to these comparatively small scale processes for the killing of micro-organisms it is frequently desirable to ensure that the contents of warehouses, holds of ships and similar large stores of material shall be free of insect life whether in the form of eggs, larvae or the adult insect. The most widely used method of treating such large stores is by fumigation with gases compatible with the treated material but toxic to insect life.

Among the gases and vapours valuable for insecticidal fumigation and bacteriological sterilisation are included formaldehyde, alkylene oxides particularly ethylene oxide, methyl bromide, sulphur dioxide and hydrogen cyanide. Formaldehyde is frequently used in the fumigation of infested premises and is conveniently sprayed as a 40% aqueous solution throughout the infested area which is then sealed for the requisite period of time. For fumigation of warehouses, holds of ships and other large stores of material the most generally used gases are ethylene oxide and methyl bromide. Ethylene oxide is used at a concentration of approximately 10 mg./litre at normal temperatures and exposure for 25 hours at this gas concentration is normally adequate for insecticidal treatment. Methyl bromide is widely used in the fumigation of stored vegetable products including fruits, grain, seed and fibrous material for which exposure to a gas concentration of 8 mg./litre for 25 hours is generally preferred. For quarantine purposes, a more drastic fumigation may be necessary and exposure to a methyl bromide concentration of 40 mg./litre for 25 hours is advisable.

Micro-organisms are generally more resistant to exposure to such toxic gases than insects and accordingly higher concentrations of lethal gases are employed for the purposes of bacteriological sterilisation. Ethylene oxide is widely used for bacteriological sterilisation and the preferred exposure is for 20 hours to an atmospheric concentration of 200 mg./litre compared with an insecticidal concentration of 10 mg./litre exposed for 25 hours.

Such gaseous treatments for both fumigation and sterilisation must exceed a certain minimum to ensure that the contaminating organisms are killed. The present methods available for the control of gaseous sterilisation and fumigation are time consuming, costly and must be carried out by trained personnel with laboratory facilities. For example, it is customary to include with material undergoing bacteriological sterilisation certain test compositions containing bacterial spores which are subsequently removed. These test organisms are then cultured by trained operators and only after a period of some days can it be reasonably certain that sterility has been achieved. Such inevitable delay leads to inefficient use of steriliser capacity and frequent re-sterilisation. Furthermore, subsequent manufacturing stages may be seriously delayed while the outcome of sterility tests is awaited. The control of fumigation is most frequently achieved by the frequent sampling, throughout the mass of material to be fumigated, of the gas and its subsequent analysis by trained laboratory personnel. Samples are obtained through a network of tubes distributed throughout the material and the procedure is thus made costly and cumbersome.

It is an object of this invention to provide a device to indicate the end-point of a fumigation or sterilisation process, i.e. when fumigation or sterilisation is complete, which does not require the use of elaborate sampling equipment, laboratory facilities or trained personnel.

During the gaseous sterilisation or fumigation of contaminated material the organisms which are surrounded by the toxic vapour are killed after a period of time dependent on the concentration of toxic gas and the ambient temperature. This time delay is probably directly related to the diffusibility of the toxic gas through the outer membrane of the organism which is controlled by the aforesaid conditions of temperature and gas concentration.

We have now discovered that the contaminating organism may be simulated by enclosing an indicator composition in a gas-permeable envelope so that when sterilisation or fumigation of contaminated material is complete a visible change is apparent through the envelope or after the contents have been added to a suitable secondary reagent.

According to the present invention there is provided an indicating device for use in determining the end point of a fumigation or bacteriological sterilisation process which utilises a gas which is lethal to the contaminating organism, which device comprises a liquid indicating composition capable of absorbing the lethal gas thereby producing a change in the composition which is visibly detectable either immediately or after admixture of the indicating composition with a suitable secondary reagent, the indicating composition being contained in an envelope which is permeable by the gas but is chemically resistant to the gas and the indicating composition.

According to the present invention there is also provided a method of determining the end point of a fumigation or bacteriological sterilisation process which utilises a lethal gas which method comprises placing one or more indicating devices as described in the preceding paragraph with or throughout the object to be treated and visually detecting the required change in the indicating composition either without further treatment thereof or after admixing the composition with a secondary reagent.

The envelope of the indicating device according to the present invention is preferably transparent or translucent and we have found that thin plastic material such as polyethylene or polyvinyl chloride sheet is particularly valuable.

In a particular embodiment of the invention a device for the control of ethylene oxide treatment of contaminated material comprises a polyethylene envelope containing an aqueous solution of magnesium chloride and added hydrochloric acid. The ethylene oxide on diffusing through the polyethylene envelope is dissolved by the magnesium chloride solution and reacts with the hydrochloric acid to form ethylene chlorhydrin thereby increasing the pH of the solution. The change of pH is shown by a suitable indicator, e.g. bromocresol purple which changes from yellow to purple or bromophenol blue which changes from yellow to blue.

In a further embodiment of the invention, a device for the control of methyl bromide treatment of contaminated material comprises a polyethylene envelope containing ethanolamine and an aqueous solution of silver nitrate. After this has been exposed to an atmosphere containing methyl bromide the contents of the envelope are added to dilute nitric acid containing an adsorption indicator. A precipitate of silver bromide is formed, the colour depending on the degree of exposure to methyl bromide.

It will be seen that by suitable choice of (a) the quantity of reactant in the indicating composition contained in an envelope of a fixed superficial area and (b) the thickness of the envelope itself, the amount of diffusion of the lethal gas may be controlled so that the detectable change occurs at the time when the material has been freed from the contaminating organisms. Once these conditions have been determined for a specific indicating device the detectable change will take place when the lethal exposure to the gas has been achieved, whatever the concentration or ambient temperature of the lethal gas may be.

It will be understood that very high concentrations of organisms will survive longer than lower spore concentrations in a given atmosphere of a lethal gas and therefore for general use a maximum expected spore concentration is laid down and the indicating device is constructed accordingly. For very high concentrations of organisms special sachets may be constructed using the same general principles but employing a thicker envelope or a greater concentration of indicating composition per unit superficial area of the envelope in order to increase the time required to reach the detectable change.

In the accompanying drawing,

FIG. 1 shows a cross-section of an indicating device according to the invention; and FIG. 2 shows a top plan view of such device.

In such drawing, 1 represents the sealed gas permeable envelope and 2 represents the indicating liquid enclosed therein.

The following examples illustrate but do not limit the scope of my invention.

EXAMPLE 1

An indicating device suitable for use in a bacteriological sterilisation process with ethylene oxide, is made in the following manner.

An ethylene oxide absorbing solution is prepared with the following composition.

|  | Ml. |
|---|---|
| Saturated magnesium chloride solution | 945 |
| Aqueous bromocresol purple solution 0.16% | 45 |
| Concentrated hydrochloric acid B.P. (sufficient to give a concentration of M/10) | 8.5 |

Sections 2" long are cut from 1" lay flat polyethylene tubing of 0.005" thickness, and one open end of each is sealed, preferably by heat welding. Into each envelope formed in this manner is introduced 3 ml. of the ethylene oxide absorbing solution and the remaining open end of the envelope is sealed. There is thus obtained an indicating device according to the invention having the characteristics at approximately 20° C. in varying ethylene oxide concentrations as shown in Table 1.

Table 2 shows the characteristics of the indicating sachet at different temperatures, for a constant gas concentration. In bacteriological sterilisation the preferred concentration of ethylene oxide is 200 mg./litre (10% v./v.) with a relative humidity 50–80%. The colour change that takes place is from yellow (non-sterile) to purple (sterile) and this is immediately visible.

Table 1

| Ethylene oxide concentration percent v./v. in air or nitrogen ambient temp. 20° C. | Time in hours required for | |
|---|---|---|
|  | Sterilisation of a soil dust spore preparation containing 10⁵ spores/gm. | Change of colour of indicating sachet yellow to purple |
| 100 | 4 | 4 |
| 50 | 4–7 | 5.5 |
| 25 | 7 | 7 |
| 10 | 16–18 | 19 |
| 5 | 24 | 26.5 |
| 2.5 | 48 | 60–80 |

Table 2

| Temperature 0° C. | Time in hours required to | |
|---|---|---|
|  | Sterilise spore dust mixture containing 10⁵ spores/gm. | Change colour of indicating sachet yellow to purple |
| 10 | 32 | 32 |
| 20 | 16–18 | 19 |
| 30 | 7 | 9 |
| 40 | 5 | 6.5 |
| 50 | 4 | 4.5 |
| 60 | 3 | 3 |

EXAMPLE 2

An indicating device suitable for use in a fumigation process requiring ethylene oxide at a concentration of 10 mg./litre for 25 hours at 15° C. is made in the following manner.

An ethylene oxide absorbing solution is prepared with the following composition:

|  | Ml. |
|---|---|
| Saturated magnesium chloride solution | 945 |
| Aqueous bromophenol blue solution 0.16% | 45 |
| Concentrated hydrochloric acid B.P. (sufficient to give a concentration of 0.019 M) | 1.6 |

An envelope of similar dimensions to that in Example 1 but of polyethylene 0.002" thick is used to contain 2 ml. of the above indicating solution to give the required indicating device. In use the colour change which is immediately visible is from yellow to blue, the fumigation being complete on the appearance of the blue colour.

EXAMPLE 3

In the manufacture of an indicating device suitable for use in a fumigation process requiring ethylene oxide at a concentration of 10 mg./litre for 25 hours at 25° C. the sachet is made as in Example 2 except that the ethylene oxide absorbing solution contains 3 ml./litre of concentrated hydrochloric acid (0.035 M).

EXAMPLE 4

An indication device suitable for use in bacteriological sterilisation requiring an atmosphere in equilibrium with 40% aqueous formaldehyde solution for 25 hours at 20° C. is made in the following manner.

A solution which absorbs formaldehyde is prepared by adding methyl orange to a 0.2% aqueous solution of hydroxylamine hydrochloride to give a concentration of 0.001%. Sufficient sodium hydroxide solution is added to give a pH of 4.6 and 2.4 ml. of this solution is sealed in a sachet as described in Example 1.

In use the colour of the solution changes from yellow (unsterile) to pink (sterile).

EXAMPLE 5

An indicating device suitable for use in a fumigation process requiring methyl bromide at a concentration of 8 mg./litre for 25 hours at 15° C. is made in the following manner.

A solution which absorbs methyl bromide is prepared with the following composition:

| | |
|---|---|
| Monoethanolamine | ml__ 666 |
| N/10 Aqueous silver nitrate | ml__ 167 |
| Distilled water | litres__ 1 |

1.5 ml. of this solution is enclosed in a sachet as described in Example 2. A colour developing reagent is prepared of the following composition:

| | |
|---|---|
| Concentrated nitric acid B.P. | ml__ 130 |
| Phenosafranine | grams__ 0.005 |
| Distilled water to | litres__ 1 |

After the exposure of the sachet to the fumigation treatment its contents are shaken with 10 ml. of the colour developing reagent.

In use the colour of the mixed solutions changes from blue when there has been insufficietn treatment to pink when the treatment is completed.

For other temperatures the absorbent sodlution may be modified in accordance with the following Table 3.

Table 3

| Ambient temperature, ° C. | Ml/litre of $\frac{N}{10}$ silver nitrate |
|---|---|
| 5 | 117 |
| 10 | 150 |
| 20 | 200 |
| 25 | 250 |
| 30 | 333 |

EXAMPLE 6

An indicating device suitable for use in quarantine fumigation requiring methyl bromide 40 mg./litre for 25 hours is made in exactly the same way as the device described in Example 5 except that N/2 silver nitrate solution is substituted for N/10 silver nitrate solution.

EXAMPLE 7

An indicating device suitable for use in a bacteriological sterilisation process requiring ethylene oxide is made in the following manner.

An ethylene oxide absorbing solution is prepared with the following composition:

| | Ml. |
|---|---|
| Saturated magnesium chloride solution | 945 |
| Aqueous bromocresol purple solution 0.16% | 45 |
| Concentrated hydrochloric acid B.P. | 23.05 |

A sachet of the same dimension as described in Example 1 is prepared from polyvinyl chloride tubing 0.005" thick and there is introduced into it 3 ml. of the above absorbing solution. There is thus obtained an indicator sachet with similar characteristics to those described in Example 1.

EXAMPLE 8

An indicating device suitable for use in a fumigation process requiring methyl bromide at a concentration of 8 mg./litre for 25 hours at 15° C. is made in the following manner.

A sachet as described in Example 2 but comprising a polyvinyl chloride envelope contains 1.5 ml. of absorbing solution of the following composition:

| | |
|---|---|
| Monoethanolamine | ml__ 666 |
| N/5 aqueous silver nitrate solution | ml__ 167 |
| Distilled water to | litres__ 1 |

After exposure of the satchet to the fumigation treatment its contents are shaken with 10 ml. of the colour developing reagent prepared from

| | |
|---|---|
| Concentrated nitric acid B.P. | ml__ 130 |
| Phenosafranine | grams__ 0.005 |
| Distilled water to | litres__ 1 |

In use the colour of the mixed solutions changes from blue when the treatment is insufficient to pink when the treatment is completed.

EXAMPLE 9

An indicating device suitable for use in a fumigation process requiring methyl bromide at a concentration of 8 mg./litre for 25 hours at 15° C. comprises a sachet exactly as described in Example 8.

After exposure of the sachet to the fumigation treatment, its contents are shaken with 10 ml. of a colour developing reagent prepared from

| | |
|---|---|
| Concentrated nitric acid B.P. | ml__ 130 |
| Ferric ammonium sulphate | grams__ 10 |
| N/10 ammonium thiocyanate solution | ml__ 5 |
| N/10 silver nitrate solution | ml__ 5 |
| Distilled water to | ml__ 1000 |

In use, the colour of the mixed reagents changes from white when the treatment is insufficient to orange-brown when the treatment is completed.

I claim:

1. An indicating device for use in determining the end point of a fumigation or bacteriological sterilisation process which utilises a gas lethal to the contaminating organism, which device comprises an aqueous liquid indicating composition capable of absorbing the lethal gas thereby producing a change in the composition which is visibly detectable, the indicating composition being contained in an envelope which is permeable by the gas but is chemically resistant to the gas and the indicating composition.

2. A device as claimed in claim 1, in which the composition contained in the envelope is one whose change becomes visible upon admixture with a secondary reagent.

3. An indicating device as claimed in claim 1, comprising a solution of a pH indicator.

4. An indicating device as claimed in claim 1, comprising an aqueous solution of magnesium chloride and a mineral acid and for use in determining the end point of a fumigation or bacteriological sterilisation process which utilises ethylene oxide.

5. An indicating device as claimed in claim 4, wherein the mineral acid is hydrochloric acid.

6. An indicating device as claimed in claim 4, comprising a solution of a pH indicator.

7. An indicating device as claimed in claim 6, wherein the pH indicator is bromophenol blue.

8. An indicating device as claimed in claim 6, wherein the pH indicator is bromocresol purple.

9. An indicating device as claimed in claim 1 comprising an aqueous solution of hydroxylamine hydrochloride and a base and for use in determining the end point of a fumigation or bacteriological sterilisation process which utilises formaldehyde.

10. An indicating device as claimed in claim 9, wherein the base is sodium hydroxide.

11. An indicating device as claimed in claim 9, comprising a solution of a pH indicator.

12. An indicating device as claimed in claim 11, wherein the pH indicator is methyl orange.

13. An indicating device as claimed in claim 1, comprising an aqueous solution of an alkanolamine and silver nitrate.

14. An indicating device as claimed in claim 13, wherein the alkanolamine is monoethanolamine.

15. An indicating device as claimed in claim 1, wherein the envelope is translucent.

16. An indicating device as claimed in claim 15, wherein the envelope is polyethylene.

17. An indicating device as in claim 15, wherein the envelope is polyvinyl chloride.

18. A method of determining the end point of a fumigation or bacteriological sterilisation process which utilises a gas which is lethal to the contaminating organism, which method comprises placing at least one indicating device comprising an aqueous liquid indicating composition capable of absorbing the lethal gas thereby producing a change in the composition which is visibly detectable, the indicating composition being contained in an envelope which is permeable by the gas but is chemically resistant to the gas and the indicating composition with the object to be treated, contacting the object to be treated and the indicating device with the treatment gas and visually detecting the required change in the indicating composition after admixing the composition with a secondary reagent.

19. A method as claimed in claim 18, wherein the lethal gas is methyl bromide and the indicating device comprises an aqueous solution of an alkanol amine and silver nitrate contained in an envelope which is permeable by the gas but is chemically resistant to the gas and the indicating composition, which method comprises admixing the indicating composition with a secondary composition comprising a mineral acid and an adsorption indicator.

20. A method as claimed in claim 19, wherein the mineral acid is concentrated nitric acid.

21. A method as claimed in claim 19, wherein the adsorption indicator is phenosafranine.

22. A method as claimed in claim 18, in which the lethal gas is methyl bromide and the indicating device comprises an aqueous solution of an alkanol amine and silver nitrate contained in an envelope which is permeable by the gas but is chemically resistant to the gas and the indicating composition, which method comprises admixing the indicating solution with a secondary composition comprising nitric acid, ferric ammonium sulphate, ammonium thiocyanate, silver nitrate and water.

23. A method of determining the end point of a fumigation or bacteriological sterilisation process which utilises a gas which is lethal to the contaminating organism, which method comprises placing at least one indicating device comprising an aqueous liquid indicating composition capable of absorbing the lethal gas thereby producing a change in the composition which is visibly detectable, the indicating composition being contained in an envelope which is permeable by the gas but is chemically resistant to the gas and the indicating composition with the object to be treated, contacting the object to be treated and the indicating device with the treatment gas and visually detecting the required change in the indicating composition without further treatment thereof.

References Cited in the file of this patent

UNITED STATES PATENTS 1,735,219    Steele et al. _____ Nov. 12, 1929

OTHER REFERENCES

German printed application of Heidrich, No. 1,031,545, June 4, 1958.